(12) United States Patent
Deutsch

(10) Patent No.: US 6,599,025 B1
(45) Date of Patent: Jul. 29, 2003

(54) HYBRID DATA PLUG

(75) Inventor: Bernhard Deutsch, Munich (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 09/174,331

(22) Filed: Oct. 19, 1998

(30) Foreign Application Priority Data

Mar. 11, 1998 (DE) .......................................... 198 10 561

(51) Int. Cl.[7] .................................................. G02B 6/38
(52) U.S. Cl. ......................................... 385/75; 439/577
(58) Field of Search ....................... 385/53–87; 439/577

(56) References Cited

U.S. PATENT DOCUMENTS

| | | | | | |
|---|---|---|---|---|---|
| 4,568,145 A | * | 2/1986 | Colin et al. | ................. | 350/96.2 |
| 4,732,446 A | * | 3/1988 | Gipson et al. | ............ | 350/96.15 |
| 5,042,146 A | * | 8/1991 | Watson | .......................... | 29/845 |
| 5,473,715 A | * | 12/1995 | Schofield et al. | .............. | 385/53 |
| 5,631,988 A | * | 5/1997 | Swirhun et al. | ............... | 385/89 |
| 5,664,039 A | * | 9/1997 | Grinderslev et al. | .......... | 385/65 |
| 5,762,516 A | * | 6/1998 | Itoga et al. | .................. | 439/404 |
| RE35,896 E | * | 9/1998 | Brunker et al. | .............. | 439/108 |
| 5,967,828 A | * | 10/1999 | Geurts et al. | ................ | 439/418 |
| 6,116,788 A | * | 9/2000 | Melchior et al. | .............. | 385/59 |

FOREIGN PATENT DOCUMENTS

| | | | | |
|---|---|---|---|---|
| GB | 0485196 A2 | * | 11/1991 | ............. G02B/6/38 |
| JP | 0330231 A2 | * | 8/1989 | ......... H01R/13/631 |

OTHER PUBLICATIONS

IBM Technical Disclosure Bulletin, vol. 40, No. 2, Feb. 1997.*

* cited by examiner

Primary Examiner—Frank G. Font
Assistant Examiner—Michael P. Mooney

(57) ABSTRACT

The hybrid data plug has a plurality of electrical contacts (20,21;26,27) and a plurality of light waveguides (30,31). The light waveguides (30,31) are held in a ferrule (16). The ferrule (16) is arranged in a region between the electrical contacts (20,21;26,27).

13 Claims, 2 Drawing Sheets

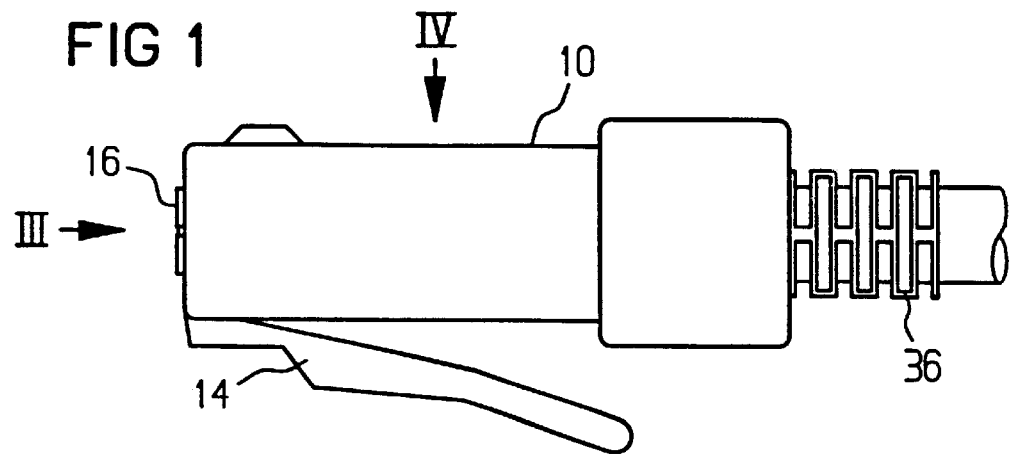
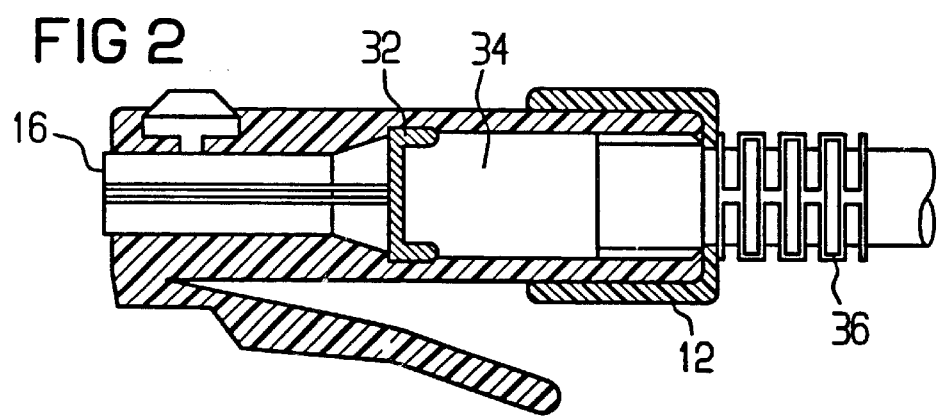
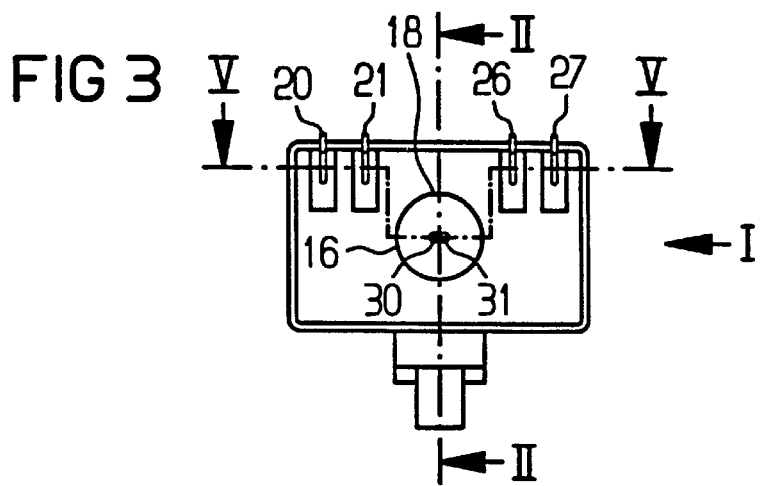

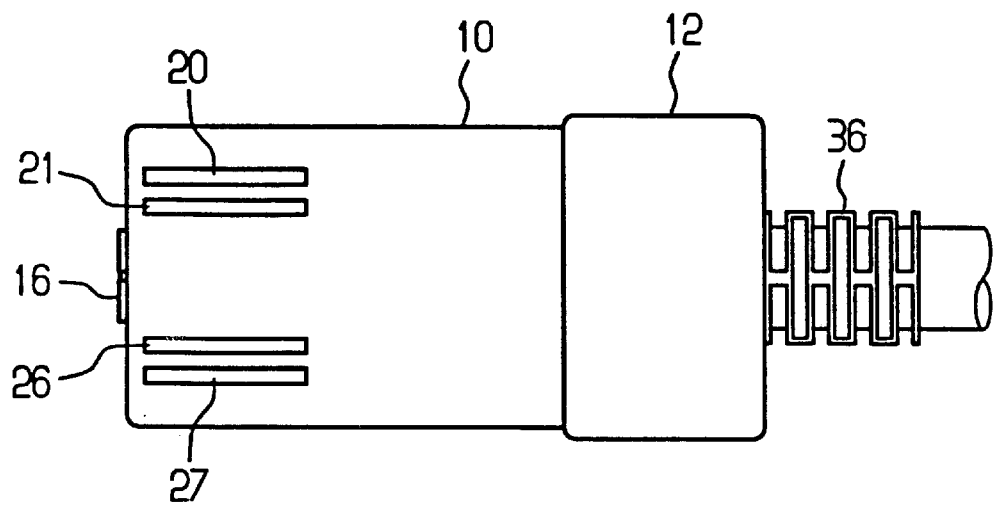
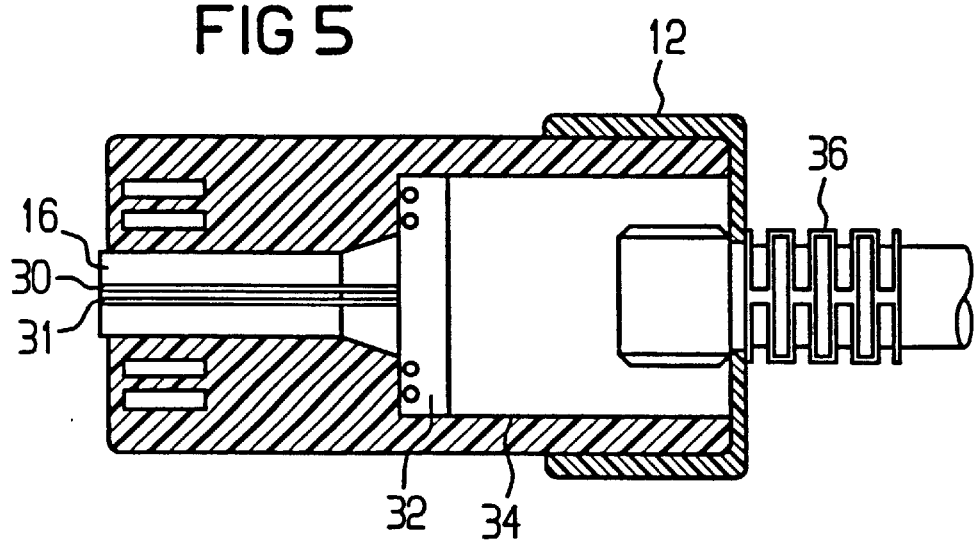

HYBRID DATA PLUG

BACKGROUND OF THE INVENTION

The present invention relates to a hybrid data plug with a plurality of electrical contacts and a plurality of light waveguides.

Such a hybrid data plug is produced or marketed by the firms Stewart Connector and Thomas & Betts. The prior art hybrid plug has a pair of electrical contacts for electronic signal transmission or electric voltage supply as well as two light waveguides for optical signal transmission. Each of the two light waveguides is accommodated in its own ferrule. The two ferrules are arranged laterally in the housing of the hybrid plug and are spaced a predetermined distance from one another. The pair of electrical contacts is arranged at the upper side of the plug housing in the region between the two ferrules.

Since in the connection technology of light waveguides, such as glass fibers extremely high requirements are generally set with respect to dimensional accuracy or positioning of the junction points in relation to each other in order to achieve a lower insertion loss, a higher outlay is necessary in order to arrange the two ferrules of the prior art plug in the plug housing with the required dimensional accuracy within the prescribed tolerances.

SUMMARY OF THE INVENTION

It is an object of the present invention to provide a data plug with efficient assembly of the light waveguides while maintaining the required precision and electrical conductors.

This object is inventively achieved by a hybrid data plug having a plurality of electrical contacts and a plurality of light waveguides, whereby the light waveguides are arranged in a single ferrule.

The expression "data plug" is to be understood as referring to not only the actual plug but also its counterpart, namely the socket or plug receptacle.

The inventive hybrid data plug (and also the appertaining inventive socket or plug receptacle) has the advantage that only a single ferrule is required and oriented in the plug housing. A considerable outlay in the production of the plug is saved in comparison to the modular plug of the prior art described above, and the production costs of the inventive plug are accordingly lower.

The inventive hybrid plug has the further advantage that it can be employed when a data transmission is implemented only over electrical cabling or only over light waveguides, or when not only a data transmission on glass fibers but also a data transmission on electrical cables is implemented. Costly conversion modules which are otherwise required in order to be able to alternate from electrical data transmission to optical data transmission and vice versa are avoided by means of the inventive plug on the basis of not only the existing optical contacting but also the existing electrical contacting. This means that as long as an electrical data transmission is utilized, the copper cores in the inventive plug (or in the inventive socket, accordingly) are used. When there is then a change to an optical transmission, the light waveguides, or respectively, glass fibers in the inventive data plug are used.

An arrangement wherein the single ferrule is arranged in the region between the two contact pairs is preferred. For example, the ferrule can extend in the middle, or respectively, in the center of the plug or plug housing, whereby one of the electrical contact pairs is respectively arranged at the left edge region, or respectively, right edge region of the housing, as seen from the ferrule. This means that the ferrule is provided in the region between the electrical contact pairs. The electrical contacts of the inventive data plug are preferably arranged in pairs. The data plugs can have two pairs of electrical contacts or four pairs, etc.

Four electrical contacts are preferably provided. In a hybrid plug with two pairs of electrical contacts the contact pairs are arranged in the plug housing such that they are far removed from each other. In one embodiment, the contacts are 1,2–7,8 according to IEC 60603. The crosstalk attenuation between the contact pairs is thereby increased.

In another embodiment, four pairs of electrical contacts are preferably provided. Four pairs of electrical contacts can be used in data plugs for electrical transmission according to gigabit Ethernet (1000 base-T), for example. The ferrule is preferably located in the region between the two pairs of electrical contacts, whereby the data plug preferably has a cross-section which is orthogonal with respect to the longitudinal extent of the light waveguide. The two pairs of electrical contacts lie in an edge region of the cross-section at a distance from each other. An optimally great spatial separation of the electrical contacts in the data plug is achieved with these advantageous developments.

The data plug preferably has a cross section that is orthogonal to the longitudinal extent of the light waveguide. The ferrule is provided in the center of the cross-section in order to achieve a high symmetry of the data plug, thus simplifying assembly.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is a lateral view of an embodiment of the inventive data plug, viewed in the direction of the arrow I of the FIG. 3;

FIG. 2 is a sectional view along the section lines II—II drawn in FIG. 3;

FIG. 3 is a front view of the embodiment of the invention according to the FIGS. 1 and 2, viewed in the direction of the arrow III in FIG. 1;

FIG. 4 is a plan view of the embodiment of the FIGS. 1 to 3 of the invention, viewed in the direction of the arrow IV of the FIG. 1; and FIG. 5 is a sectional view of the embodiment of the FIGS. 1 to 4, viewed along the section lines V—V of the FIG. 3.

DESCRIPTION OF THE PREFERRED EMBODIMENTS

FIG. 1 depicts a lateral view of an embodiment of the inventive modular and hybrid data plug. The modular data plug essentially comprises a square housing 10, a ferrule 16 with two light waveguides 30 and 31, two pairs of electrical contacts 20, 21 and 26, 27 accommodated in the housing 10, a latch spring 14 with release lever at the lower side of the housing 10, and a hood 12 with which a cable 36 is secured at the housing 10 of the modular plug.

The electrical contacts 20, 21 and 26, 27 extend at an upper side (see FIG. 2 and FIG. 3) of the housing 10, whereby the electrical contacts 20 and 21 represent a first contact pair, and the electrical contacts 26 and 27, a second contact pair. The electrical contacts 20, 21 and 26, 27 project from the upper side of the housing 10 for contacting and extend in parallel fashion inside the housing 10 in the region of the upper side of the housing 10 in the direction of an end of the housing 10 accepting cable all the way to a wiring rail 32 see FIG. 5) or wire bar at which the individual electrically conductive leads of the cable 36 are secured. As is clearly illustrated in the FIGS. 3 and 4, the two pairs of electrical contacts are separated from each other in the region of the upper side of the housing 10 in order to maintain a large crosstalk attenuation between the two pairs of electrical contacts. The dimensions of the electrical contacts 20, 21 and 26, 27 (particularly the measure and the distance between the electrical contacts or the contact pairs) correspond to those of the conventional RJ-45 plug according to IEC 60603-7.

The ferrule 16 is arranged in the middle, or respectively, centrally in the housing 10 in the region between the pairs of electrical contacts 20, 21 and 26, 27, this housing having a rectangular cross-section that is perpendicular to the longitudinal extent of the ferrule 16. The two light waveguides 30 and 31 (e.g. glass fibers which are monomode or multimode fibers) extend inside the ferrule 16 in parallel fashion over the entire length of the ferrule 16. The ferrule 16 is laid out as a cylindrical body and consists of plastic or ceramic, for example. The ferrule can also be rectangular as in plug type MPO (IEC 61754). The ferrule 16 projects somewhat beyond the front side of the housing 10 (FIG. 1) and has a recess 18 or flattening at its perimeter as guide.

A connection piece 34 arranged for two light waveguides is attached to the ferrule 16 in the interior of the housing 10, this piece 34 connecting the end of the cable 36 to the ferrule 16. Together with the ends of the cable 36 the transition piece 34 is secured (by means of a hood 12) at the allocated end of the housing 10 of the plug accepting cable. The hood 12 is implemented as a crimp barrel.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A hybrid data plug, comprising:
    a housing having a plurality of electrical contacts arranged in pairs and a plurality of light waveguides; and
    a ferrule in the housing for holding the plurality of light waveguides, the ferrule located in a region between two pairs of electrical contacts;
    wherein the data plug has a cross-section that is orthogonal with respect to the longitudinal extent of the light waveguides, wherein the two pairs of electrical contacts reside in an edge region of the cross-section at a distance from each other, and wherein the ferrule is provided in a center of the cross-section.

2. The data plug according to claim 1, wherein the ferrule has a guide.

3. The data plug according to claim 2, wherein the guide has at least one recess at a perimeter of the ferrule extending along the ferrule.

4. A hybrid data plug, comprising:
    a housing having a plurality of electrical contacts in a first plane; and
    a ferrule for holding a plurality of light waveguides in a second plane;
    wherein the data plug has a cross-section that is orthogonal to the first and second planes, and wherein the ferrule is disposed in a center portion of the cross-section of the data plug.

5. The hybrid data plug of claim 4, wherein the plurality of electrical contacts are disposed in an edge region of the housing.

6. The hybrid data plug of claim 4, wherein the plurality of electrical contacts comprises two pairs of electrical contacts.

7. The hybrid data plug of claim 6, wherein the ferrule is disposed in a region between the two pairs of electrical contacts.

8. A housing for a hybrid data plug, comprising:
    a plurality of electrical contacts disposed in an edge region of the housing;
    a single ferrule disposed in a region between the electrical contacts; and
    a plurality of light wave guides disposed within the ferrule;
    wherein the housing has a cross-section that is orthogonal with respect to a longitudinal extent of the light waveguide, and wherein the ferrule is located in a center of the cross-section.

9. The housing of claim 8, wherein the plurality of electrical contacts are arranged in pairs.

10. The housing of claim 8, wherein the plurality of electrical contacts comprise two pairs of electrical contacts.

11. The housing of claim 8, wherein the electrical contacts are in a first plane, wherein the plurality of light waveguides are in a second plane, and wherein the cross-section is orthogonal to the first and second planes.

12. The housing of claim 8, wherein the ferrule has a guide.

13. The housing of claim 12, wherein the guide has at least one recess at a perimeter of the ferrule extending along the ferrule.

* * * * *